United States Patent
Yoshida et al.

(10) Patent No.: US 6,798,961 B2
(45) Date of Patent: Sep. 28, 2004

(54) OPTICAL FIBER AND OPTICAL FIBER WIRING BOARD USING THE OPTICAL FIBER

(75) Inventors: Minoru Yoshida, Hyogo (JP); Katsuaki Kondo, Hyogo (JP)

(73) Assignee: Mitsubishi Cable Industries, Ltd., Hyogo (JP)

(*) Notice: Subject to any disclaimer, the term of this patent is extended or adjusted under 35 U.S.C. 154(b) by 50 days.

(21) Appl. No.: 10/343,219

(22) PCT Filed: Aug. 3, 2001

(86) PCT No.: PCT/JP01/06711
§ 371 (c)(1),
(2), (4) Date: Jan. 30, 2003

(87) PCT Pub. No.: WO02/12936
PCT Pub. Date: Feb. 14, 2002

(65) Prior Publication Data
US 2003/0147609 A1 Aug. 7, 2003

(51) Int. Cl.[7] .............. G02B 6/02; G02B 6/16
(52) U.S. Cl. ............ 385/123; 385/124; 385/31
(58) Field of Search .............. 385/27, 28, 29, 385/30, 31, 32, 123, 124

(56) References Cited

U.S. PATENT DOCUMENTS 5,020,871 A 6/1991 Nishimura

FOREIGN PATENT DOCUMENTS

| JP | 62-297808 | 12/1987 |
|----|-----------|---------|
| JP | 1-169410 | 7/1989 |
| JP | 1-180505 A | 7/1989 |
| JP | 9-61638 A | 3/1997 |
| JP | 9-113729 | 5/1997 |
| JP | 10-293227 A | 11/1998 |
| JP | 11-119034 A | 4/1999 |

OTHER PUBLICATIONS

Holland, W. R. et al., "Optical Fiber Circuits". In: Proceedings 43rd Electronic Components & Technology Conference, (1993), pp. 711 to 717.

Primary Examiner—Mark A. Robinson
Assistant Examiner—Alessandro Amari
(74) Attorney, Agent, or Firm—Donald R. Studebaker; Nixon Peabody LLP

(57) ABSTRACT

Optical fibers (220) are routed over a substrate (210), and an optical fiber wiring board (200) is thereby constructed. A relative refraction index difference Δ of the optical fiber (220) is increased to be greater than a relative refraction index difference $Δ_0$ of a communication-dedicated single mode optical fiber, and a core diameter thereof is increased to be larger than a core diameter of the communication-dedicated optical fiber. Thereby, a mode field diameter thereof is set to be substantially the same as a mode field diameter of the communication-dedicated optical fiber.

13 Claims, 5 Drawing Sheets

FIG. 5

| | WAVELENGTH OF PROPAGATION LIGHT [μm] | CUT-OFF WAVELENGTH λc [μm] | MFD [μm] | RELATIVE REFRACTION INDEX DIFFERENCE Δ [%] | CORE DIAMETER [μm] |
|---|---|---|---|---|---|
| ITU STANDARDS G652 | 1.31 | 1.1-1.28 | 9.5±0.5 | | |
| | 1.55 | | (10.5±0.5) | | |
| EMBODIMENT 1 | 1.55 | 1.55 | 10.5 | 0.36 | 8 |
| EMBODIMENT 2 | | 1.54 | 10.0 | 0.39 | 9.3 |
| | | | | 0.425 | 8.8 |

OPTICAL FIBER AND OPTICAL FIBER WIRING BOARD USING THE OPTICAL FIBER

TECHNICAL FIELD

The present invention relates to an optical-fiber wiring board and an optical-fiber wiring assembly for optically interconnecting optical elements, optical circuits or optical apparatuses, and more particularly to an optimal optical fiber for the optical-fiber wiring board.

BACKGROUND ART

Conventionally, an optical-fiber wiring board is used to optically interconnect optical elements, optical circuits or optical apparatuses. The optical-fiber wiring board is constructed to include a plurality of optical fibers routed on a substrate in a predetermined pattern. Generally, a communication-dedicated single mode optical fiber having an outside diameter of 250 $\mu$m is used as an optical fiber that is routed on the optical-fiber wiring board. For example, Japanese Unexamined Patent Publication No. 2000-66035 discloses an optical fiber having an outside diameter of 125 $\mu$m for an optical-fiber wiring board.

In the optical-fiber wiring board, a number of portions in which the optical fibers are bent and routed. As such, the bending loss of the optical fibers is increased, and the performance of the optical-fiber wiring board is thereby lowered. Hence, for the optical-fiber wiring board, the optical fibers need to be routed not to increase the bending loss. However, a problem arises in that such a routing manner makes it difficult to implement the miniaturization of the optical-fiber wiring board.

In more specific, on the optical-fiber wiring board, linear portions where the optical fibers are routed to be linear on the substrate and curved portions where the optical fibers are bent and routed to be curved. In order to prevent the increase in the bending loss of the optical fiber in the curved portion, the curved portion needs to be formed to have a minimum radius of curvature, specifically, a radius of curvature greater than a minimum radius of curvature allowable with respect to the bending loss. However, in order to form the curved portion with the radius of curvature greater than the minimum radius of curvature, the area of the substrate needs to be proportionally increased. Consequently, the size of the optical-fiber wiring board is enlarged.

In addition, on the optical-fiber wiring board, crossover sections are formed in each of which two optical fibers are routed such that the one optical fiber (upper optical fiber) crosses over the other optical fiber (lower optical fiber) routed in contact with the surface of the substrate. In this crossover section, the upper optical fiber is routed to be bendable. In order to reduce the bending loss of the upper optical fiber, the upper optical fiber needs to be routed to have a radius of curvature greater than the minimum radius of curvature. However, when the upper optical fiber is routed to have a radius of curvature greater than the minimum radius of curvature, mutual interference occurs between the upper optical fiber and other optical fibers routed adjacent to the lower optical fiber routed on the substrate. In order to prevent the interference, the wiring density of the optical fibers on the substrate needs to be reduced. In order to achieve the reduction, however, the area of the substrate needs to be enlarged, which consequently leads to enlargement of the size of the optical-fiber wiring board.

When the number of the crossover sections formed on the optical-fiber wiring board is reduced, the bending loss on the overall optical-fiber wiring board is reduced. However, the reduction in the number of the crossover sections cannot be implemented unless otherwise the area of the substrate is enlarged. As such, the size of the optical-fiber wiring board needs to be enlarged to reduce the number of the crossover sections.

Thus, with ordinary communication-dedicated optical fibers used with a device such as an optical-fiber wiring board on which the fibers are bent and routed, the bending loss is increased. When the optical fibers are routed considering the bending loss to prevent the problem, another problem arises in that the size of the device using the optical fibers is enlarged.

The present invention is made in view of the above-described circumstances, and an object thereof is to provide an optical fiber suitable for use in an environment including many portions where the optical fiber is bent. More particularly, the present invention is to provide an optical fiber that is optimal for use with an optical-fiber wiring board, and an optical-fiber wiring board and an optical-fiber wiring assembly that use the optical fiber.

DISCLOSURE OF INVENTION

In order to achieve the above-described object, the present invention has been accomplished by paying attention to the fact that an optical fiber used with an optical-fiber wiring board or the like has an overall length of about 0.5 to 1 m, which is considerably small in comparison with the length of an optical fiber used for communication. Specifically, the present invention has been accomplished by paying attention to the fact that dissimilar to an ordinary communication-dedicated single mode optical fiber, such as a communication-dedicated single mode optical fiber according to the ITU (International Telecommunication Union) standards, since the length of the optical fiber used with the aforementioned optical-fiber wiring board or the like is short, the dispersion need not be taken into consideration as a design parameter.

In specific, a first aspect of the present invention is intended for an optical fiber of a single mode type including a core and a cladding.

As characteristics, a relative refraction index difference of the core and the cladding is increased to be greater than a relative refraction index difference of a communication-dedicated single mode optical fiber, and a core diameter is increased to be larger than a core diameter of the communication-dedicated single mode optical fiber. Thereby, a mode field diameter is set to be substantially the same as a mode field diameter of the communication-dedicated single mode optical fiber.

By thus increasing the relative refraction index difference of the core and the cladding to be greater than the relative refraction index difference of the communication-dedicated single mode optical fiber, confinement of light into the core is enhanced. Consequently, when the optical fiber is bent, it is suppressed that light in the core transmit to the cladding. As such, in comparison to the communication-dedicated optical fiber, the optical fiber reduces the bending loss. That is, the minimum radius of curvature of the optical fiber is less than the minimum radius of curvature of the communication-dedicated optical fiber.

However, when the relative refraction index difference of the optical fiber is increased to be greater than that of the communication-dedicated single mode optical fiber, the mode field diameter thereof becomes smaller than the mode field diameter of the communication-dedicated single mode optical fiber. As such, when the optical fiber is connected to the ordinary communication-dedicated single mode optical fiber, the connection loss is increased.

For this reason, according to the optical fiber of the first aspect of the present invention, the core diameter is increased to be larger than the core diameter of the communication-dedicated single mode optical fiber, whereby the mode field diameter is set to be substantially the same as the mode field diameter of the communication-dedicated single mode optical fiber. This arrangement prevents the connection loss from being increased when the optical fiber is connected to the communication-dedicated single mode optical fiber.

As described above, according to the optical fiber of the first aspect of the present invention, the bending loss is reduced, and the connection loss is not increased even when it is connected to the communication-dedicated single mode optical fiber. As such, the optical fiber is suitable to an environment including many portions where it is bent; and it can be optimally used with, for example, an optical-fiber wiring board.

It is noted that the first aspect of the present invention is realized by not considering the dispersion as an optical-fiber design parameter. For example, for the optical fiber to be used with a length of 10 m or shorter, the dispersion need not be taken into consideration as a design parameter.

Herein, the relative refraction index difference $\Delta$ [%] is preferably set to satisfy:

$$\Delta_0 < \Delta \leq \Delta_0 + 0.5 [\%],$$

where the relative refraction index difference of the communication-dedicated single mode optical fiber is represented by $\Delta_0 [\%]$.

The setting is thus performed for the following reasons. Generally, when the relative refraction index difference $\Delta$ is increased, a cut-off wavelength is increased. However, the cut-off wavelength needs to be set to be less than a wavelength (for example, 1.3 μm or 1.55 μm) of propagation light that propagates through the optical fiber. Hence, when the relative refraction index difference $\Delta$ is set to be excessively large in comparison with the ordinary relative refraction index difference $\Delta_0$, control of the cut-off wavelength to a predetermined value becomes difficult. For this reason, the setting is preferably performed so that the deviation between the relative refraction index difference $\Delta$ of the optical fiber and the relative refraction index difference $\Delta_0$ of the communication-dedicated single mode optical fiber is within 0.5%.

The cut-off wavelength herein is a theoretical cut-off wavelength theoretically calculated according to the structure of the optical fiber. In comparison, a practical cut-off wavelength (effective cut-off wavelength) is less than the theoretical cut-off wavelength depending on, for example, the length of the optical fiber and the construction of other optical fibers connected to the front and the back of the optical fiber.

As such, the theoretical cut-off wavelength of the optical fiber may be set in such a manner that the effective cut-off wavelength is equal to or less than a wavelength of the propagation light.

For example, the theoretical cut-off wavelength $\lambda c$ [μm] may be set to satisfy:

$$\lambda < \lambda c \leq \lambda + 0.05 [\mu m],$$

where the wavelength of the propagation light is represented by $\lambda$ [μm].

Thus, even with the optical fiber designed by setting the theoretical cut-off wavelength to be longer than the wavelength of the propagation light, the effective cut-off wavelength becomes less than the wavelength of the propagation light. On the other hand, even with the relative refraction index difference increased corresponding to the increase in the length of the theoretical cut-off wavelength, the mode field diameter of the optical fiber takes a desired value. Consequently, an optical fiber for which the bending loss is even more reduced can be obtained.

A second aspect of the present invention is intended for an optical-fiber wiring board including: an optical fiber of a single mode type including a core and a cladding; and a substrate on which the optical fiber is routed.

As characteristics of the above, the optical fiber is constructed in such a manner that a relative refraction index difference of the core and the cladding is increased to be greater than a relative refraction index difference of a communication-dedicated single mode optical fiber and a core diameter thereof is increased to be larger than a core diameter of the communication-dedicated single mode optical fiber. Thereby, a mode field diameter thereof is set to be substantially the same as a mode field diameter of the communication-dedicated single mode optical fiber.

The optical-fiber wiring board may include a curved portion where the optical fiber is routed to be in a circular arc shape.

In addition, the optical-fiber wiring board may include a crossover section where two optical fibers are routed to cross over one another on the substrate.

The substrate preferably has an adhesive layer for adhering the optical fiber.

The optical fibers on the optical-fiber wiring board may be routed on the substrate in such a manner as to perform matrix conversion of inputs of m ports (m represents a natural number) and n channels (n represents a natural number) into outputs of n ports and m channels.

As described above, since the optical fiber routed on the substrate of the optical-fiber wiring board has the relative refraction index difference that is greater than the relative refraction index difference of the communication-dedicated single mode optical fiber, the bending loss is reduced. Therefore, the bending loss is not increased even when the optical fiber is routed at a small radius of curvature on the substrate. The bending loss is not increased also in the crossover section where the two optical fibers cross over one another. Consequently, miniaturization can be implemented for the optical-fiber wiring board. Further, since the minimum radius of curvature formed when the optical fiber is routed is small, a fiber-routing pattern of the optical fiber on the optical-fiber wiring board can be changed to a more complex fiber-routing pattern.

Further, since the bending loss of the optical fiber is reduced, the performance of the optical-fiber wiring board is stabilized. Furthermore, for example, even in a case where the optical fiber routed on the substrate is bent following the substrate itself that is bent, the bending loss of the optical fiber is not increased. As such, the optical-fiber wiring board is capable of securely maintaining a predetermined performance.

Preferably, the optical fiber on the optical-fiber wiring board is constructed in such a manner that a relative refraction index difference $\Delta$ [%] thereof is set to satisfy:

$$\Delta_0 < \Delta \leq \Delta_0 + 0.5 [\%],$$

where the relative refraction index difference of the communication-dedicated single mode optical fiber is represented by $\Delta_0$ [%].

A theoretical cut-off wavelength of the optical fiber is preferably set in such a manner that an effective cut-off wavelength is equal to or less than a wavelength of propagation light.

The theoretical cut-off wavelength λc [μm] of the optical fiber is preferably set to satisfy:

$$\lambda < \lambda c \leq +0.05 \ [\mu m],$$

where the wavelength of the propagation light is represented by λ [μm].

A third aspect of the present invention is intended for an optical-fiber wiring assembly constructed in such a manner that a communication-dedicated single mode optical fiber is connected to each of input and output ports of an optical-fiber wiring board including an optical fiber of a single mode type including: a core and a cladding; and a substrate on which the optical fiber is routed.

As characteristics of the above, the optical fiber is constructed in such a manner that a relative refraction index difference of the core and the cladding is increased to be greater than a relative refraction index difference of the communication-dedicated single mode optical fiber and a core diameter thereof is increased to be larger than a core diameter of the communication-dedicated single mode optical fiber, whereby a mode field diameter thereof is set to be substantially the same as a mode field diameter of the communication-dedicated single mode optical fiber.

As described above, the mode field diameter of the optical fiber and the mode field diameter of the communication-dedicated single mode optical fiber in the optical-fiber wiring assembly are substantially the same. Therefore, even when the communication-dedicated single mode optical fiber is connected to the optical fiber, the connection loss is not increased. As such, an ordinary communication-dedicated single mode optical fiber can be connected to each of input and output ports of the optical-fiber wiring board.

BRIEF DESCRIPTION OF THE DRAWINGS

FIG. 5 is a view showing fiber parameters of an ordinarily communication-dedicated single mode optical fiber, and examples of fiber parameters of optical fibers according to the present invention.

BEST MODES FOR CARRYING OUT THE INVENTION

Figure 1:
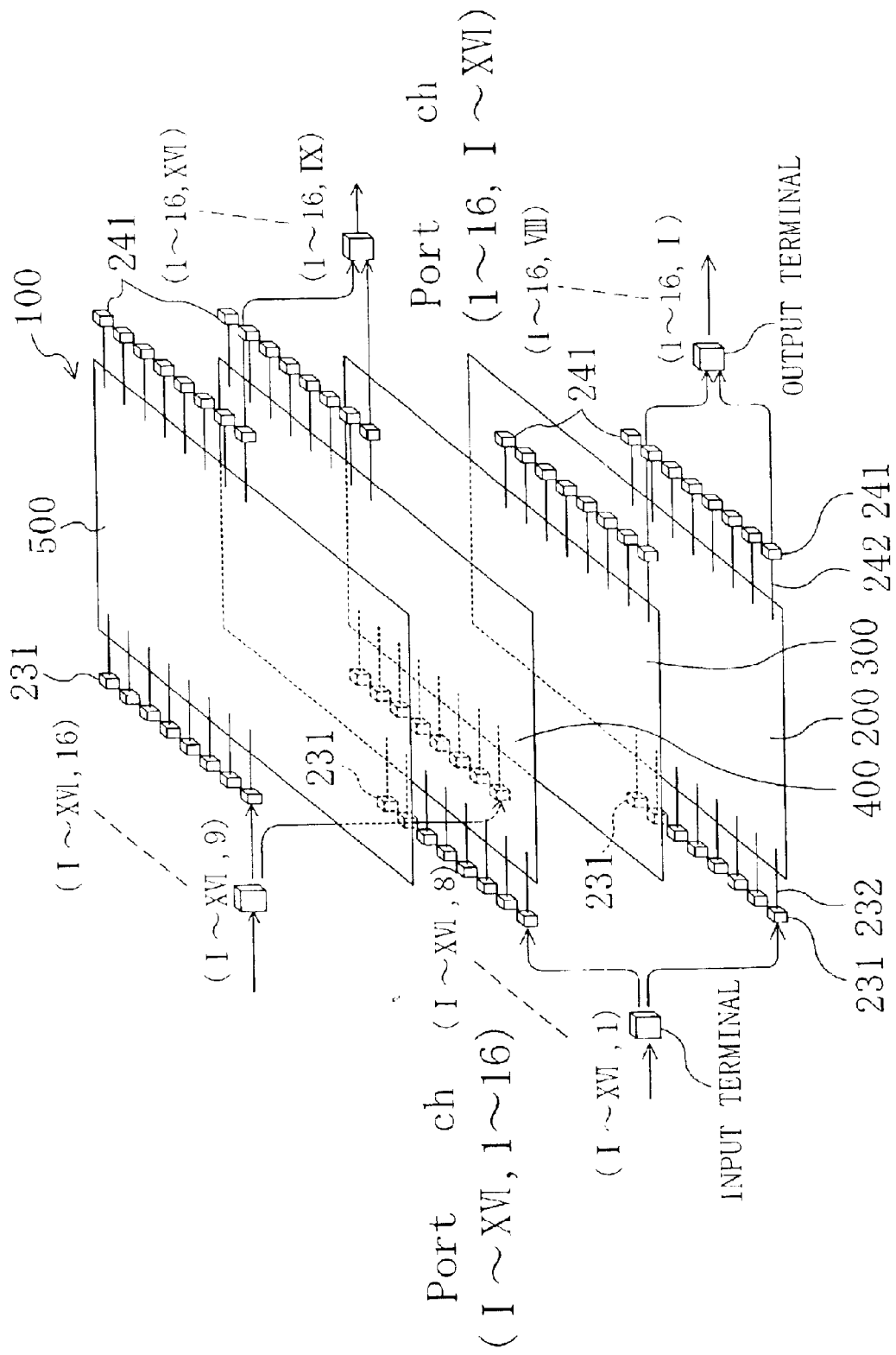
FIG. 1 is an exploded perspective view showing an optical matrix conversion wiring board according to an embodiment of the present invention.

FIG. 1 shows an example of an optical matrix conversion wiring board 100 according to an embodiment of the present invention. The optical matrix conversion wiring board is an optical-fiber wiring board that converts inputs of m ports and n channels (hereinafter, referred to as "(m, n) inputs". It is noted that the letters "m" and "n" each represents a natural number) into outputs of n ports and m channels (hereinafter, referred to as "(n, m) outputs"). The optical matrix conversion wiring board 100 (hereinafter, referred to as an m×n optical matrix conversion wiring board) has advantages in that a number of optical fibers are arranged in units of a channel, thereby preventing erroneous wiring, and in that the optical fibers are routed on a plane, whereby a reduced storage area suffices for installation.

The optical matrix conversion wiring board 100 shown in FIG. 1 includes 16 input terminals and 16 output terminals, and it is constructed to be a 16×16 optical matrix conversion wiring board for converting (I to XVI, 1 to 16) inputs to (1 to 16, I to XVI) outputs. In FIG. 1, input terminals and output terminals are partly omitted for illustration. The optical matrix conversion wiring board 100 is constructed of first to forth sub-wiring boards 200 to 500 laminated one above the other.

Figure 2:
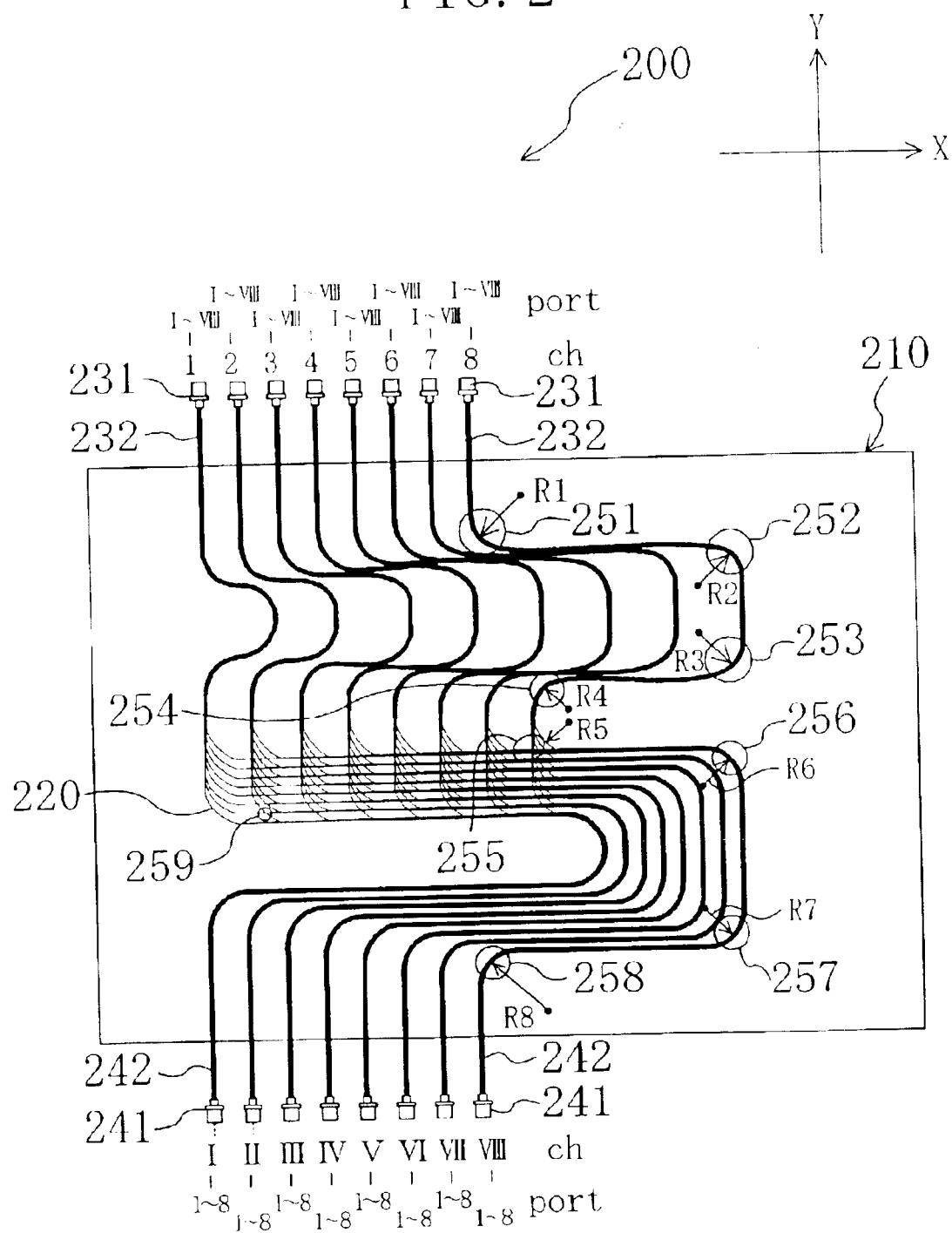
FIG. 2 is a view showing an example of a sub-wiring board.

As shown in FIG. 2, each of the sub-wiring boards 200 to 500 (first sub-wiring board 200 in FIG. 2) is constructed of a substrate 210 and optical fibers 220 routed on the substrate 210. In addition, as shown in FIG. 1, each of the sub-wiring boards 200 to 500 includes input-side optical connectors 231 to which the input terminals are connected and output-side optical connectors 241 to which the output terminals are connected. The input-side optical connectors 231 and the output-side optical connectors 241 are individually formed of 8-conductor MT connectors. On each of the sub-wiring boards 200 to 500, since 64 optical fibers 220 are routed, eight input-side optical connectors 231 and eight output-side optical connectors 241 are provided on each of the sub-wiring boards 200 to 500. The optical connectors 231 and 241 are not limited to the 8-conductor connectors, but may be other multi-conductor connectors.

In the optical matrix conversion wiring board 100, (I to VIII, 1 to 8) inputs and (1 to 8, I to VIII) outputs are connected on the first sub-wiring board 200, and (I to VIII, 9 to 16) inputs and (9 to 16, I to VIII) outputs are connected on the second sub-wiring board 300. In addition, (IX to XVI, 1 to 8) inputs and (1 to 8, IX to XVI) outputs are connected on the third sub-wiring board 400, and (IX to XVI, 9 to 16) inputs and (9 to 16, IX to XVI) outputs are connected on the fourth sub-wiring board 500. According to the above-described construction, on the optical matrix conversion wiring board 100, the (I to XVI, 1 to 16) inputs are fed to the individual input-side optical connectors 231 of the fist to fourth sub-wiring boards 200 to 500 via the input terminals. In addition, the (1 to 16, I to XVI) outputs are obtained from the individual output-side optical connectors 241 of the first to fourth sub-wiring boards 200 to 500 via the output terminals.

Hereinafter, the structures of the individual sub-wiring boards 200 to 500 will be described in detail with reference to FIGS. 2 and 3. The first to fourth sub-wiring boards 200 to 500 have same structures with one another, except that the fiber-routing patterns of the optical fibers 220 are different. As such, hereinafter, description will be given of the first sub-wiring board 200 as an example.

The first sub-wiring board 200 includes the substrate 210 on which an adhesive layer 211 is formed, and the optical fiber 220 is adhered to the adhesive layer 211 and is thereby fixed to the substrate 210.

A material having a high resistance against vibration is preferably used for the substrate 210 to prevent the routed optical fiber 220 from easily being deflected. As a material for forming the substrate 210, for example, a polyimide resin, a polyethylene terephthalate resin or a polyethylene naphthalate resin may be used.

The adhesive layer 211 is a layer having tackiness or adhesion property, and it may be any layer capable of securely fixing the optical fiber 220. The adhesive layer 211 may therefore be formed using a known pressure sensitive adhesive or an adhesive (such as a silicone adhesive).

In the sub-wiring board 200 thus formed, the optical fibers 220 routed on the substrate 210 may be covered by a laminate layer (not shown). This enables the optical fibers 220 to be protected from outside forces and humidity. In addition, the fiber-routing stability is enhanced, thereby improving the reliability. As the laminate layer, polytetrafluoroethylene (PTFE) or the like may be used.

In addition, on the first sub-wiring board 200, eight optical fibers 220 are connected to each of the input-side optical connectors 231, and each optical fiber bundle 232 is formed such that the eight optical fibers 220 are routed in close contact with one another. Accordingly, eight input-side optical fiber bundles 232 are provided.

Each of the input-side optical fiber bundles 232 is routed in a predetermined fiber-routing pattern on the substrate 210 in a portion from an input-side edge portion of the substrate 210 to the vicinity of a central portion thereof. Specifically, in a portion from an input-side edge portion of the substrate 210 to the vicinity of a central portion thereof, each of the optical fiber bundles 232 is routed on the substrate 210 in such a manner as to form linear portions extending in the X direction and the Y direction and curved portions 251 to 254 (radii of curvature R1 to R4) curved to be a ¼ circular arc shape.

In the vicinity of the central portion of the substrate 210, the optical fibers 220 constituting the each of the optical fiber bundles 232 are separated one by one. At this time, each of the optical fibers 220 is routed in such a manner as to form a curved portion 255 having a radius of curvature R5.

In the vicinity of the central portion of the substrate 210, the individual optical fibers 220 separated from the one optical fiber bundle 232 are routed in close contact with individual optical fibers 220 separated from seven other optical fiber bundles 232. Thereby, eight output-side optical fiber bundles 242, each of which includes eight optical fibers 220 as one bundle, are formed. In this manner, the input-side optical fiber bundles 232 individually corresponding to channels (ch 1 to 8) including ports I to VIII are restructured into the output-side optical fiber bundles 242 individually corresponding to channels (ch I to VIII) including ports 1 to 8. For example, each of the optical fibers 220 of the input-side ch 1 is included in the ports 1 of the output-side ch I to VIII.

Also similar to the input-side optical fiber bundle 232, each of the output-side optical fiber bundle 242 is routed in a predetermined fiber-routing pattern on the substrate 210 in the portion from the vicinity of a central portion of the substrate 210 to an output-side edge portion thereof. More specifically, in a portion from the vicinity of a central portion of the substrate 210 to an output-side edge portion thereof, each of the optical fiber bundles 242 is routed on the substrate 210 in such a manner as to form linear portions extending in the X direction and the Y direction and curved portions 256 to 258 (radii of curvature R6 to R8) curved to be a ¼ circular arc shape. In addition, the output-side optical connectors 241 are individually connected to the eight output-side optical fiber bundles 242.

The first sub-wiring board 200 may preferably be manufactured using, for example, an X-Y plotter (not shown). Specifically, a fiber-routing head of the X-Y plotter is moved along the predetermined fiber-routing pattern on the substrate 210, and concurrently, the optical fiber 220 is provided onto the substrate 210 (adhesive layer 211) via the fiber-routing head. At this time, the provided optical fiber 220 is pressed at a predetermined force onto the adhesive layer 211, and the optical fiber 220 is thereby adhered to the adhesive layer 211. Thus, the optical fiber 220 is routed in the predetermined fiber-routing pattern on the substrate 210. These steps are repeatedly performed for all the 64 optical fibers 220, thereby enabling the first sub-wiring board 200 as shown in FIG. 2 to be manufactured.

The first sub-wiring board 200 (optical matrix conversion wiring board 100) includes, for example, many crossover sections 259 in each of which two optical fibers 220 routed in such a manner as to cross over one another on the substrate 210, and a number of curved portions 251 to 258 in each of which the optical fiber 220 is routed in such a manner as to be curved to be the ¼ circular arc shape.

Figure 3:
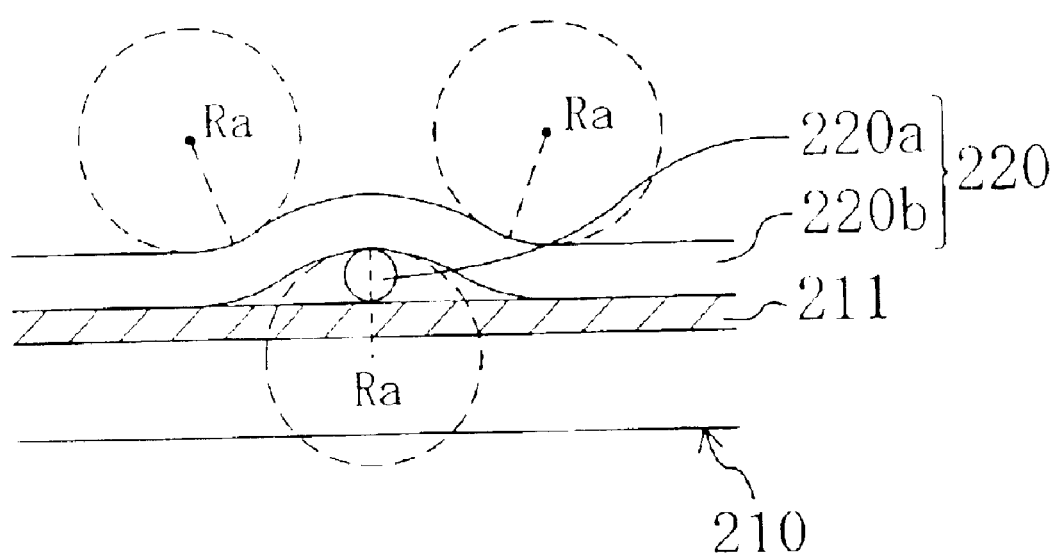
FIG. 3 is an enlarged cross-sectional view showing a crossover section of the sub-wiring board.

As shown in FIG. 3, a lower optical fiber 220a is adhered onto the adhesive layer 211 in the crossover section 259. On the other hand, an upper optical fiber 220b is disposed in contact with the lower optical fiber 220a and to cross over the lower optical fiber 220a. In addition, the upper optical fiber 220b is disposed in such a manner as to have a predetermined radius of curvature Ra. The radius of curvature Ra is set to be greater than the minimum radius of curvature allowable with respect to the bending loss of the optical fiber 220.

Similarly, in the individual curved portions 251 to 258, each of the radii of curvature R1 to R8 of the individual optical fibers 220 is set to be greater than the minimum radius of curvature. Each of the curved portions 251 to 258 need not necessarily be in the circular arc shape, and the optical fiber 220 may instead be formed in such a manner as to have a radius of curvature greater than the minimum radius of curvature.

Hereinafter, the optical fibers 220 used with the optical matrix conversion wiring board 100 will be described. In comparison to an ordinarily communication-dedicated single mode optical fiber, the optical fiber 220 is shorter in the overall length. As such, dissimilar to the communication-dedicated single mode optical fiber, the optical fiber 220 is designed without considering dispersion as a design parameter.

In specific, for the optical fiber 220, a relative refraction index difference $\Delta$ [%] of a core and a cladding and a core diameter thereof are set in such a manner that a mode field diameter (MFD) and a cut-off wavelength $\lambda c$ individually take predetermined values.

Figure 4:
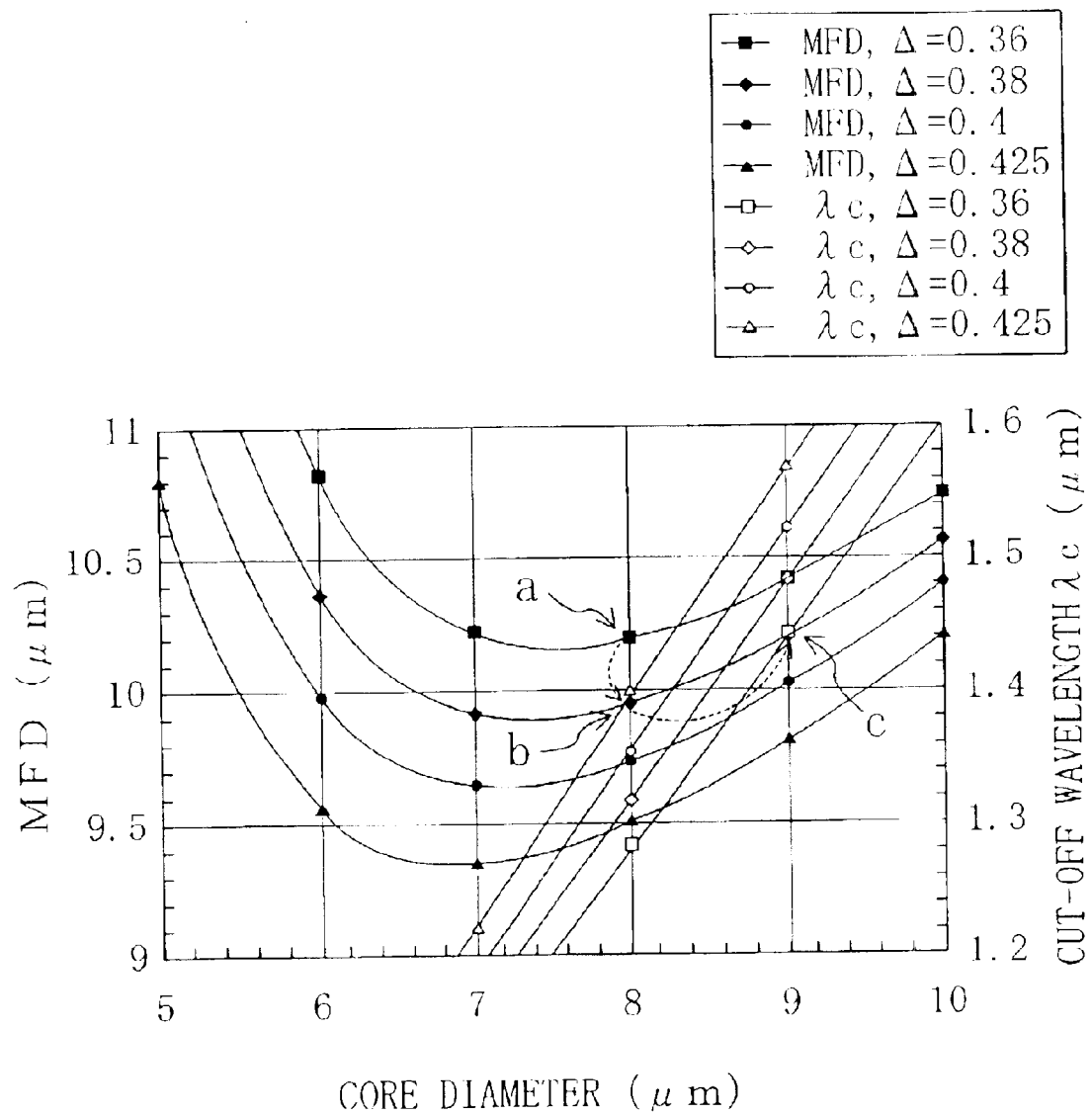
FIG. 4 is a view showing the relationship among core diameters, mode field diameters and cut-off wavelengths.

That is, as shown in FIG. 4, the core diameter, the MFD, the cut-off wavelength $\lambda c$, and the relative refraction index difference $\Delta$, which are design parameters of the optical fiber, are related to one another. When the cut-off wavelength $\lambda c$ and the MFD are set, the relative refraction index difference $\Delta$ and the core diameter are individually determined according thereto. For example, as shown in FIG. 5, in the case of a communication-dedicated single mode optical fiber according to the ITU standards, when the wavelength of propagated light is 1.3 $\mu$m, the cut-off wavelength $\lambda c$ is determined to be 1.1 to 1.28 $\mu$m, and the MFD is determined to be 9.5±0.5 $\mu$m (G652). Thereby, the relative refraction index difference $\Delta$ of the optical fiber is determined to be 0.36%, and the core diameter thereof is determined to be 8 $\mu$m. When the wavelength of propagated light is 1.55 $\mu$m, an ordinary communication-dedicated single mode optical fiber is designed to have an MFD of 10.5±0.5 $\mu$m (it is noted that this value is a standard value, not a specification value). Accordingly, the relative refraction index difference $\Delta$ is determined to be 0.36%, and the core diameter is determined to be 8 $\mu$m.

In comparison to the above, the optical fiber 220 is designed to have a relative refraction index difference $\Delta$ greater than a relative refraction index difference (hereinafter, referred to as an ordinary relative refraction index difference $\Delta_0$ [%]) of the normal communication-dedicated single mode optical fiber. Thereby, the optical fiber 220 is imparted with an enhanced confinement of light into the core. Consequently, even when the optical fiber 220 is bent, it is suppressed that light in the core transmit to the cladding. That is, the optical fiber 220 reduces the bending loss.

Generally, when the relative refraction index difference $\Delta$ is greater than the ordinary relative refraction index difference $\Delta_0$, the MFD of the optical fiber is less than the MFD of the ordinary communication-dedicated single mode optical fiber (hereinafter, referred to as an ordinary MFD). In this state, when the optical fiber is connected to the ordinary communication-dedicated single mode optical fiber, the connection loss is increased. For this reason, the core diameter of the optical fiber 220 is increased to be larger than the core diameter of the ordinary communication-dedicated single mode optical fiber. Thereby, the MFD of the optical fiber 220 is set to be substantially the same as the ordinary MFD, and the increase in the connection loss is prevented.

In addition, generally, when the relative refraction index difference $\Delta$ is increased, the cut-off wavelength $\lambda c$ of the optical fiber is increased. However, the cut-off wavelength $\lambda c$ needs to be set to be less than a wavelength (for example, 1.3 µm or 1.55 µm) of propagation light that propagates through the optical fiber. Hence, when the relative refraction index difference $\Delta$ is set to be excessively great in comparison with the ordinary relative refraction index difference $\Delta_0$, control of the cut-off wavelength to a predetermined value becomes difficult. For this reason, the relative refraction index difference $\Delta$ is preferably set so that the deviation thereof with respect to the ordinary relative refraction index difference $\Delta_0$ is within 0.5%. Specifically, the relative refraction index difference $\Delta$ is preferably set to satisfy:

$$\Delta_0 < \Delta \leq \Delta_0 + 0.5 \ [\%].$$

The cut-off wavelength $\lambda c$ is a theoretical cut-off wavelength $\lambda c$ theoretically calculated according to the structure of the optical fiber. In comparison, a practical cut-off wavelength (effective cut-off wavelength) is less than the theoretical cut-off wavelength $\lambda c$ depending on, for example, the length of the optical fiber (fiber-routing pattern of the optical fiber 220 in each of the sub-wiring boards 200 to 500) and the construction of other optical fibers connected to the front and the back of the optical fiber. As such, the theoretical cut-off wavelength $\lambda c$ of the optical fiber 220 is preferably set so that the effective cut-off wavelength is equal to or less than the propagation-light wavelength. In this case, while the effective cut-off wavelength is equal to or less than the propagation-light wavelength, the theoretical cut-off wavelength $\lambda c$ is increased to be greater than that in the ordinary case. Accordingly, even with the relative refraction index difference $\Delta$ increased corresponding to the increase in the length of the theoretical cut-off wavelength $\lambda c$, an optical fiber with a desired MFD can be designed. Consequently, an optical fiber for which the bending loss is even more reduced can be obtained. Specifically, the theoretical cut-off wavelength $\lambda c$ may be set to be greater than the propagation-light wavelength so that the deviation between the theoretical cut-off wavelength $\lambda c$ and the propagation-light wavelength is 0.5 µm or less. More specifically, the theoretical cut-off wavelength $\lambda c$ may be set to satisfy:

$$\lambda < \lambda c \leq \lambda + 0.05 \ [\mu m],$$

where the propagation-light wavelength is represented by $\lambda$ [µm].

Design of the optical fiber 220 will now be described in detail with reference to FIG. 4. An optical fiber used as a reference is an ordinary communication-dedicated single mode optical fiber of which the propagation-light wavelength is 1.55 µm. The relative refraction index difference $\Delta$ of this optical fiber is 0.36%, and the core diameter thereof is 8 µm (see arrow a in FIG. 4), whereby the cut-off wavelength $\lambda c$ is set about 1.28 µm, and the MFD is set about 10.2 µm.

First, only the relative refraction index difference $\Delta$ is increased to 0.38%. Thereby, the MFD is reduced to be slightly less than 10 µm (see arrow b in the same figure). In this state, since the loss of connection to an ordinary communication-dedicated optical fiber is increased, the MFD needs to be increased to an ordinary MFD. Specifically, the core diameter is increased to, for example, 9 µm, whereby the MFD is changed to 10.2 µm (see arrow c in the same figure) so as to become substantially the same as the ordinary MFD.

At this time, the cut-off wavelength $\lambda c$ is about 1.48 µm, which is less than the propagation-light wavelength, and the optical fiber can be used as an optical fiber of a 1.55 µm band.

FIG. 5 shows examples of fiber parameters of an optical fiber to which the present invention is applied. Specifically, in a case where the relative refraction index difference $\Delta$ is set to 0.39% and the core diameter is set to 9.3 µm, an optical fiber having a cut-off wavelength $\lambda c$ of 1.55 µm and an MFD of 10.5 µm can be obtained (Embodiment 1). In addition, in a case where the relative refraction index difference $\Delta$ is set to 0.425% and the core diameter is set to 8.8 µm, an optical fiber having a cut-off wavelength $\lambda c$ of 1.54 µm and an MFD of 10.0 µm can be obtained (Embodiment 2). In the cases of optical fibers to which the present invention is applied, the relative refraction index differences $\Delta$ are 0.36% to 0.45%, and the core diameters are 7 µm to 10 µm.

Generally, the less the relative refraction index difference $\Delta$ and the smaller the core diameter of an optical fiber, the more likely the bending loss of the optical fiber occurs. However, in the case of the optical fiber according to the present invention, the absence of consideration of the dispersion enables design to be performed at a degree of freedom increased thereby. Specifically, increasing the relative refraction index difference $\Delta$ of the optical fiber enables the bending loss thereof to be reduced. In other words, this enables a reduction in the minimum radius of curvature formed when routing the optical fiber. Accordingly, using the optical fiber enables the minimum radius of curvature (Ra) in the crossover section 259 of each of the sub-wiring boards 200 to 500 to be reduced, and concurrently enabling reduction of each of the radii of curvature (R1 to R8) in the curved portions 251 to 258 (see FIGS. 2 and 3). This enables the sizes of the sub-wiring boards 200 to 500 to be miniaturized, consequently resulting in miniaturization of the size of the optical matrix conversion wiring board 100. In addition, the fiber-routing pattern of the optical fibers on the optical matrix conversion wiring board 100 can be changed to a more intricate fiber-routing pattern. Further, the reduction in the bending loss of the optical fiber 220 enables the performance of the optical matrix conversion wiring board 100 to be stabilized.

Furthermore, even when the relative refraction index difference $\Delta$ is large, the MFD of the optical fiber 220 is substantially the same as the ordinary MFD. This enables the prevention of increase in connection loss occurring when ordinary communication-dedicated optical fibers are connected to the individual input and output ports of the optical matrix conversion wiring board 100.

It is noted that the optical fiber according to the present invention, that is, the optical fiber of which the bending loss is reduced and the MFD is set to be substantially the same as that of an ordinary communication-dedicated single mode optical fiber, can suitably be used not only for optical-fiber wiring boards, but also for other use environments including many portions where the fiber is bent.

What is claimed is:

1. An optical fiber of a single mode type comprising a core and a cladding, wherein a relative refraction index difference of the core and the cladding is increased to be greater than a relative refraction index difference of a communication-dedicated single mode optical fiber and a core diameter is increased to be larger than a core diameter of the communication-dedicated single mode optical fiber, whereby a mode field diameter is set to be substantially the same as a mode field diameter of the communication-dedicated single mode optical fiber.

2. An optical fiber according to claim 1, wherein a relative refraction index difference $\Delta$ [%] is set to satisfy:

$$\Delta_0 < \Delta \leq \Delta_0 + 0.5 \ [\%],$$

where the relative refraction index difference of the communication-dedicated single mode optical fiber is represented by $\Delta_0$ [%].

3. An optical fiber according to claim 1, wherein a theoretical cut-off wavelength is set in such a manner that an effective cut-off wavelength is equal to or less than a wavelength of propagation light.

4. An optical fiber according to claim 3, wherein a theoretical cut-off wavelength $\lambda c$ [μm] is set to satisfy:

$$\lambda < \lambda c \leq \lambda + 0.05 \ [\mu m],$$

where the wavelength of the propagation light is represented by $\lambda$ [μm].

5. An optical-fiber wiring board comprising: an optical fiber of a single mode type including a core and a cladding; and a substrate on which the optical fiber is routed, wherein the optical fiber is constructed in such a manner that a relative refraction index difference of the core and the cladding is increased to be greater than a relative refraction index difference of a communication-dedicated single mode optical fiber and a core diameter thereof is increased to be larger than a core diameter of the communication-dedicated single mode optical fiber, whereby a mode field diameter thereof is set to be substantially the same as a mode field diameter of the communication-dedicated single mode optical fiber.

6. An optical-fiber wiring board according to claim 5, wherein a relative refraction index difference $\Delta$ [%] of the optical fiber is set to satisfy:

$$\Delta_0 < \Delta \leq \Delta_0 + 0.5 \ [\%],$$

where the relative refraction index difference of the communication-dedicated single mode optical fiber is represented by $\Delta_0$ [%].

7. An optical-fiber wiring board according to claim 5, wherein a theoretical cut-off wavelength of the optical fiber is set in such a manner that an effective cut-off wavelength is equal to or less than a wavelength of propagation light.

8. An optical fiber according to claim 7, wherein the theoretical cut-off wavelength $\lambda c$ [μm] of the optical fiber is set to satisfy:

$$\lambda < \lambda c \leq \lambda + 0.05 \ [\mu m],$$

where the wavelength of the propagation light is represented by $\lambda$ [μm].

9. An optical-fiber wiring board according to claim 5, comprising a curved portion where the optical fiber is routed to be in a circular arc shape.

10. An optical-fiber wiring board according to claim 5, comprising a crossover section where two optical fibers are routed to cross over one another on the substrate.

11. An optical-fiber wiring board according to claim 5, wherein the substrate has an adhesive layer for adhering the optical fiber.

12. An optical-fiber wiring board according to claim 5, wherein the optical fibers are routed on the substrate in such a manner as to perform matrix conversion of inputs of m ports (m represents a natural number) and n channels (n represents a natural number) into outputs of n ports and m channels.

13. An optical-fiber wiring assembly constructed in such a manner that a communication-dedicated single mode optical fiber is connected to each of input and output ports of an optical-fiber wiring board including: an optical fiber of a single mode type having a core and a cladding; and a substrate on which the optical fiber is routed, wherein the optical fiber is constructed in such a manner that a relative refraction index difference of the core and the cladding is increased to be greater than a relative refraction index difference of the communication-dedicated single mode optical fiber and a core diameter thereof is increased to be larger than a core diameter of the communication-dedicated single mode optical fiber, whereby a mode field diameter thereof is set to be substantially the same as a mode field diameter of the communication-dedicated single mode optical fiber.

* * * * *